(12) United States Patent
Gerardo (10) Patent No.: US 10,551,023 B2
(45) Date of Patent: *Feb. 4, 2020

(54) COMPACT MULTI-FUNCTION LED LIGHTHEAD

(71) Applicant: Tony Gerardo, Bristol, CT (US)

(72) Inventor: Tony Gerardo, Bristol, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/102,305

(22) Filed: Aug. 13, 2018

(65) Prior Publication Data

US 2018/0363876 A1  Dec. 20, 2018

Related U.S. Application Data

(63) Continuation of application No. 15/355,589, filed on Nov. 18, 2016, now Pat. No. 10,054,283, which is a
(Continued)

(51) Int. Cl.
*F21S 43/14* (2018.01)
*F21S 43/19* (2018.01)
(Continued)

(52) U.S. Cl.
CPC ............ *F21S 43/14* (2018.01); *B60Q 1/2615* (2013.01); *F21S 43/19* (2018.01); *F21S 43/195* (2018.01);
(Continued)

(58) Field of Classification Search
CPC ............................. F21Y 2107/50; F21S 43/14
See application file for complete search history.

(56) References Cited

U.S. PATENT DOCUMENTS

| 4,754,375 A | 6/1988 | Ferenc |
| 5,101,326 A * | 3/1992 | Roney ................. B60Q 1/2615 |
| | | 362/545 |

(Continued)

OTHER PUBLICATIONS

"Whelen: V-Series Super-LED® Surface Mount Lighthead," product description, http://www.emergencyeguipmentnews.net/2013/01/27/whelen-v-series-super-led-surface-mount-lighthead/, 2013.
(Continued)

*Primary Examiner* — Alexander K Garlen
(74) *Attorney, Agent, or Firm* — Dilworth IP, LLC (57) ABSTRACT

A multifunction lighthead for mounting to a vehicle includes several groups of LEDs arranged to provide distinct light emission patterns. Each group of LEDs and associated optics are selected and positioned to produce light emission patterns needed to meet lighting standards applicable to the vehicle. Such standards may require wide angle light emission, which is enhanced by supporting groups of LEDs that project away from the vehicle body, enhancing visibility of the lighthead from directions close to a plane defined by the body panel. The projecting support for the LEDs and optics for a wide angle light emission pattern may be employed to support LEDs arranged for ground illumination. Other groups of LEDs in the same lighthead may be arranged with optics to provide area illumination in support of arrest, search, triage or other emergency functions.

20 Claims, 9 Drawing Sheets

US 10,551,023 B2
Page 2

Related U.S. Application Data continuation of application No. 14/211,158, filed on Mar. 14, 2014, now Pat. No. 9,505,342.

(60) Provisional application No. 61/790,744, filed on Mar. 15, 2013.

(51) Int. Cl.
| | | |
|---|---|---|
| *F21S 43/20* | (2018.01) | |
| *F21S 43/31* | (2018.01) | |
| *F21S 43/40* | (2018.01) | |
| *F21S 45/50* | (2018.01) | |
| *B60Q 1/26* | (2006.01) | |
| *F21Y 115/10* | (2016.01) | |

(52) U.S. Cl.
CPC ............... *F21S 43/26* (2018.01); *F21S 43/31* (2018.01); *F21S 43/40* (2018.01); *F21S 45/50* (2018.01); *F21Y 2115/10* (2016.08)

(56) References Cited

U.S. PATENT DOCUMENTS

| | | | |
|---|---|---|---|
| 5,567,036 A | 10/1996 | Theobald et al. | |
| 6,241,373 B1 | 6/2001 | Kelley et al. | |
| 6,425,678 B1 | 7/2002 | Verdes et al. | |
| 6,598,996 B1 | 7/2003 | Lodhie | |
| 6,863,424 B2 | 3/2005 | Smith | |
| 7,118,261 B2* | 10/2006 | Fredericks | B64D 47/06 |
| | | | 362/545 |
| 7,245,203 B2 | 7/2007 | Stephens et al. | |
| 7,712,931 B1 | 5/2010 | Smith | |
| 7,794,124 B2 | 9/2010 | Hulsey et al. | |
| 2006/0039159 A1 | 2/2006 | Grote, III et al. | |
| 2006/0239021 A1 | 10/2006 | Inaba | |
| 2007/0080645 A1* | 4/2007 | Smith | B60Q 1/2607 |
| | | | 315/83 |
| 2007/0183168 A1 | 8/2007 | Naganawa et al. | |
| 2009/0045933 A1* | 2/2009 | Smith | B60Q 1/18 |
| | | | 340/468 |
| 2009/0206719 A1* | 8/2009 | Horiguchi | B60Q 1/2696 |
| | | | 313/46 |
| 2010/0013366 A1 | 1/2010 | Hare | |
| 2010/0271818 A1 | 10/2010 | Smith | |
| 2011/0075431 A1* | 3/2011 | Wu | F21V 29/20 |
| | | | 362/373 |
| 2013/0265793 A1* | 10/2013 | Helbig | F21S 41/192 |
| | | | 362/538 |

OTHER PUBLICATIONS

SoundOff Signal Products Brochures; http://www.soundoffsignal.com/, 2013.
Spplementary European Search Report dated Feb. 15, 2017 (European Patent Application No. 14768946.7).

* cited by examiner

COMPACT MULTI-FUNCTION LED LIGHTHEAD

CROSS-REFERENCE TO RELATED APPLICATIONS

This application is a continuation of U.S. application Ser. No. 15/355,589 filed on Nov. 18, 2016, which is a continuation of U.S. application Ser. No. 14/211,158 filed on Mar. 14, 2014 (issued as U.S. Pat. No. 9,505,342), which claims the benefit of U.S. Provisional Application No. 61/790,744 filed on Mar. 15, 2013.

BACKGROUND OF THE DISCLOSURE

The present disclosure relates to lightheads, and more particularly, to LED lightheads for mounting to vehicles.

Lightheads for mounting to a motor vehicle may be mounted in any one of a multitude of positions and orientations to provide specific lighting functions. Some examples of lighting functions include fog lighting, warning lighting, spot lighting, takedown lighting, ground lighting, and alley lighting, each having directional, intensity, color and emission pattern requirements. Emergency vehicles often utilize lightheads to give visual indications of their presence during emergencies. Different types of emergency vehicles must meet distinct requirements for emergency warning lights, frequently requiring many distinct warning light modules to be mounted to body panels. Mounting each distinct warning light may require one or more holes in the body panel and running electrical power to the location of each warning light. The multiplicity of warning lights can complicate the manufacture of emergency vehicles. Warning light modules may also be referred to as lightheads. Relevant standards include California Title 13, NFPA standards for firefighting equipment and the Federal KKK standard for ambulances. These standards may include ground lighting and scene lighting requirements in addition to standards for warning light signals intended to alert motorists and individuals at any position around the vehicle.

The mounting location for a lighthead may relate to the specific lighting function that the lighthead serves. Lightheads are commonly mounted to any of a number of surfaces on a motor vehicle. Surfaces to which the lightheads are mounted may include the front grille, side panels, front bumper, rear bumper, brush guard, push bumper, roof, roof rack, and/or side-view mirrors.

Traditional lightheads may provide limited functionality in each individual unit. Most lightheads are designed for a specific function, and have the ability to produce a specific light emission pattern. In order to provide light emission for different functions and required standards, a vehicle must traditionally utilize multiple lightheads, each lighthead configured for the desired function and pattern of illumination.

Accordingly, there is a need in the market for a compact, multifunction LED lighthead.

SUMMARY

According to aspects of the disclosure, a compact multi-function LED lighthead comprises a thermally conductive base parallel with a vertically oriented plane, first and second PC boards, a support, at least first and second pluralities of LEDs, and a light-transmissive lens attachable to the base.

The first PC board is mounted in thermally conductive relationship to the base. The support has first and second surfaces which are oriented transverse to one another in a generally v-shaped configuration. The support is connected in thermally conductive relationship to the base and extends away from the vertical plane defined by the base. A first plurality of LEDs are mounted in groups to the first and second support surfaces and configured to emit a first distinct light emission pattern in a generally horizontal direction.

In one embodiment, an optic covers each group of the first plurality of LEDs. The optic is a wide-angle collimator having swept ends which creates a wider angle light emission pattern than is possible with LEDs alone.

A second PC board extends perpendicularly away from the first PC board and is adjacent to the bottom edges of the first and second surfaces of the support and secured beneath the support. A second plurality of LEDs are mounted to the second PC board and configured to emit a second distinct light emission pattern in a generally vertical direction. The first and second groups of LEDs may be arranged on PC boards connected by wires, or constructed with flexible connectors manufactured with the PC boards.

The configuration of the support and the position of the second PC board play important roles in generating the first and second specific patterns of light. Extending the support away from the base allows light emitted by the first plurality of LEDs to be seen at any point between vantage points close to the vertical plane, representing a side panel of an emergency vehicle. Additionally, arranging LEDs on the second PC board allows the second plurality of LEDs to emit light in a direction perpendicular to said first plurality of LEDs that is not blocked by a lip created by a recessed portion of the base, lens, and bezel in which the electronic components are secured.

In one embodiment a third plurality of LEDs are mounted to the first PC board and configured to emit a third light emission pattern in a generally horizontal direction.

A lighthead according to aspects of the current disclosure emits multiple distinct patterns of light in a single compact package, eliminating the need for multiple individual light heads. In addition to reducing clutter on the surface of an emergency vehicle, a lighthead of the current disclosure is relatively inconspicuous. Since the function of three lightheads can be served by a single lighthead mount, a lighthead of the current disclosure may be utilized for unmarked law enforcement vehicles without drawing attention.

BRIEF DESCRIPTION OF THE DRAWINGS

Aspects of the preferred embodiment will be described in reference to the drawings, where like numerals reflect like elements.

DETAILED DESCRIPTION OF THE PREFERRED EMBODIMENT

Embodiments of a compact multi-function lighthead will now be described with reference to the Figures, wherein like numerals represent like parts throughout the FIGS. 1-8.

Figure 1:
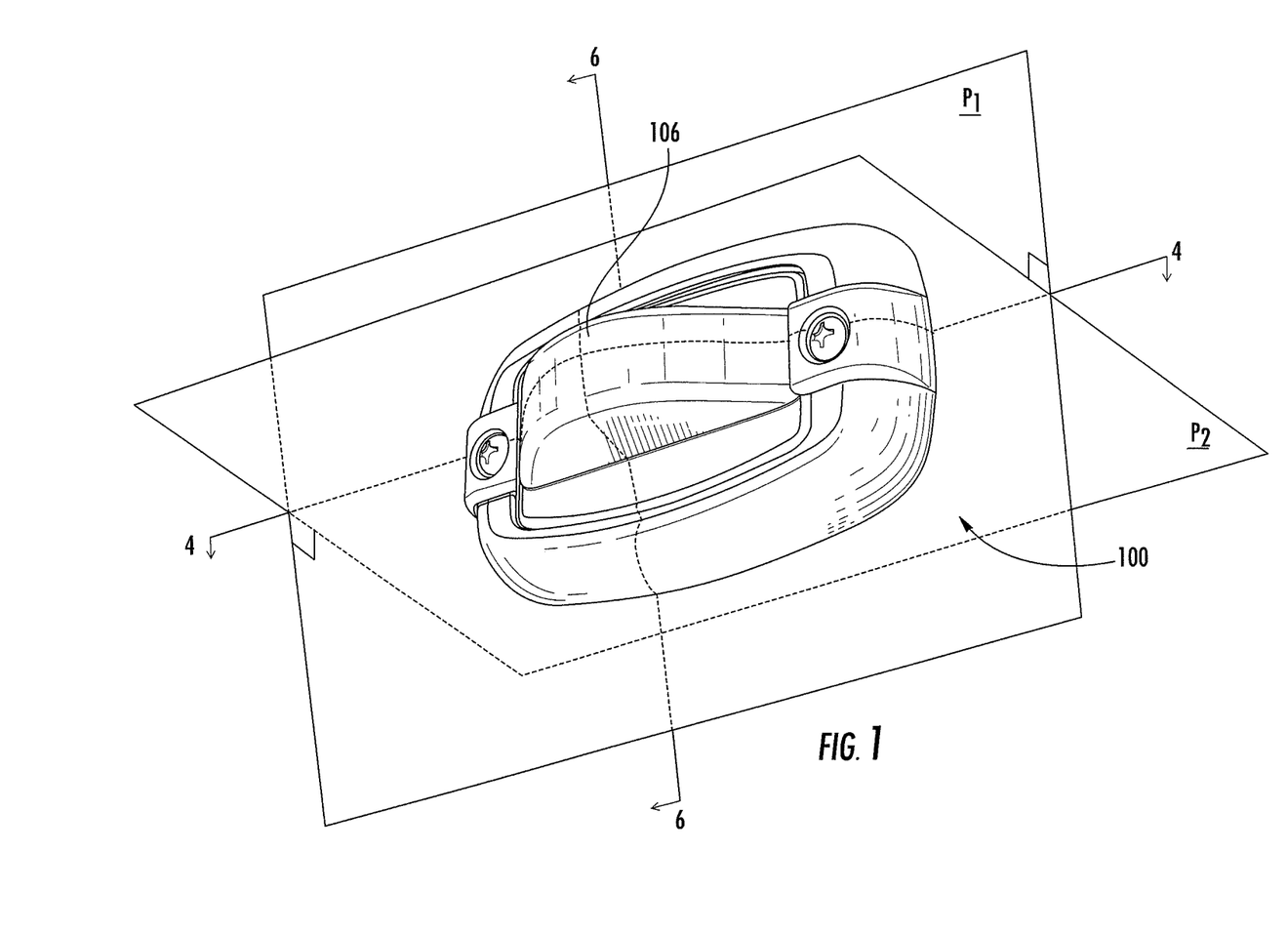
FIG. 1 is a perspective view of a fully assembled embodiment of a compact multi-function lighthead of the current disclosure, planes $P_1$ and $P_2$ are included for illustrative purposes.
Figure 2:
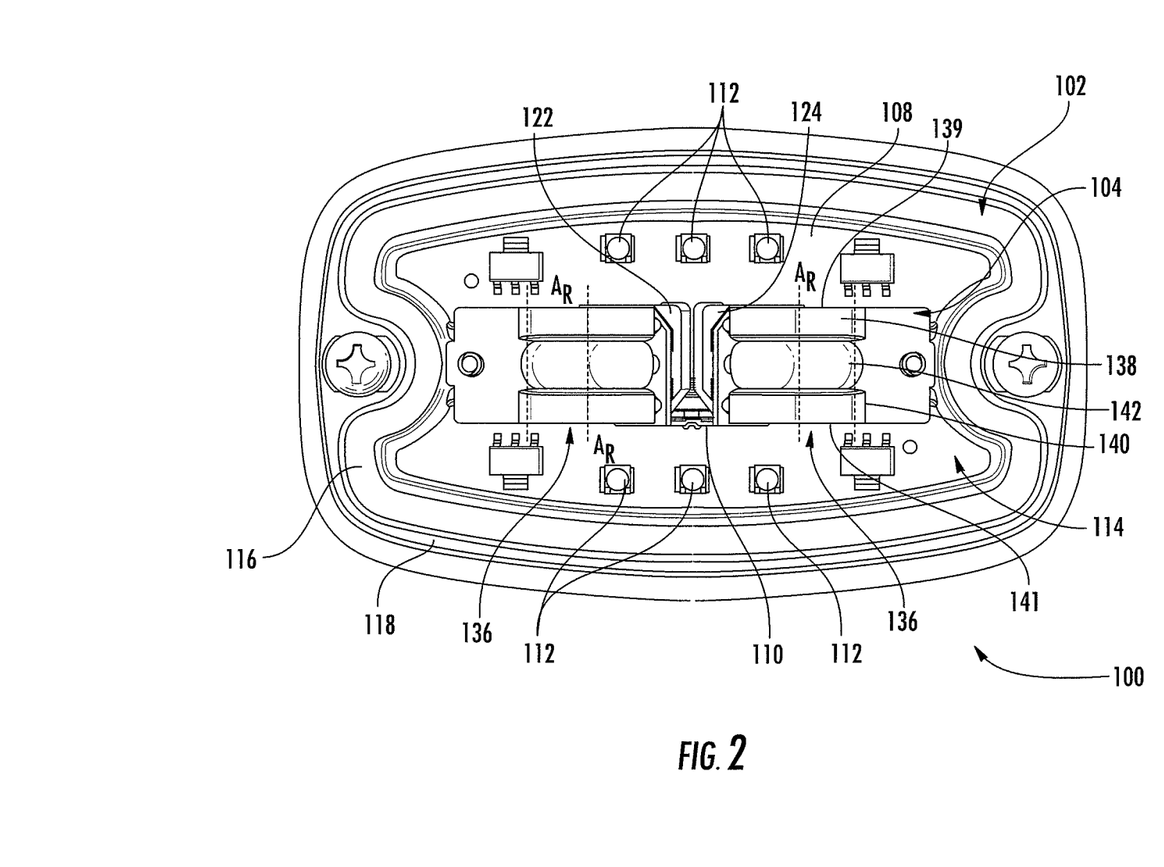
FIG. 2 is a frontal view of the lighthead of FIG. 1, the lens and bezel are omitted for clarity.

FIGS. 1 and 2 depict a lighthead 100 for attachment to a vehicle (not shown). The lighthead 100 generally comprises a thermally conductive base 102, a thermally conductive support 104, a light transmissive lens 106 attachable to said base 102, and first and second PC boards 108 and 110, respectively. A vertically oriented plane $P_1$ is parallel with the base 102, while a horizontally oriented plane $P_2$ intersects the lighthead 100 along a length denoted by line 4-4. $P_1$ and $P_2$ perpendicularly intersect along line 4-4.

Figure 8:
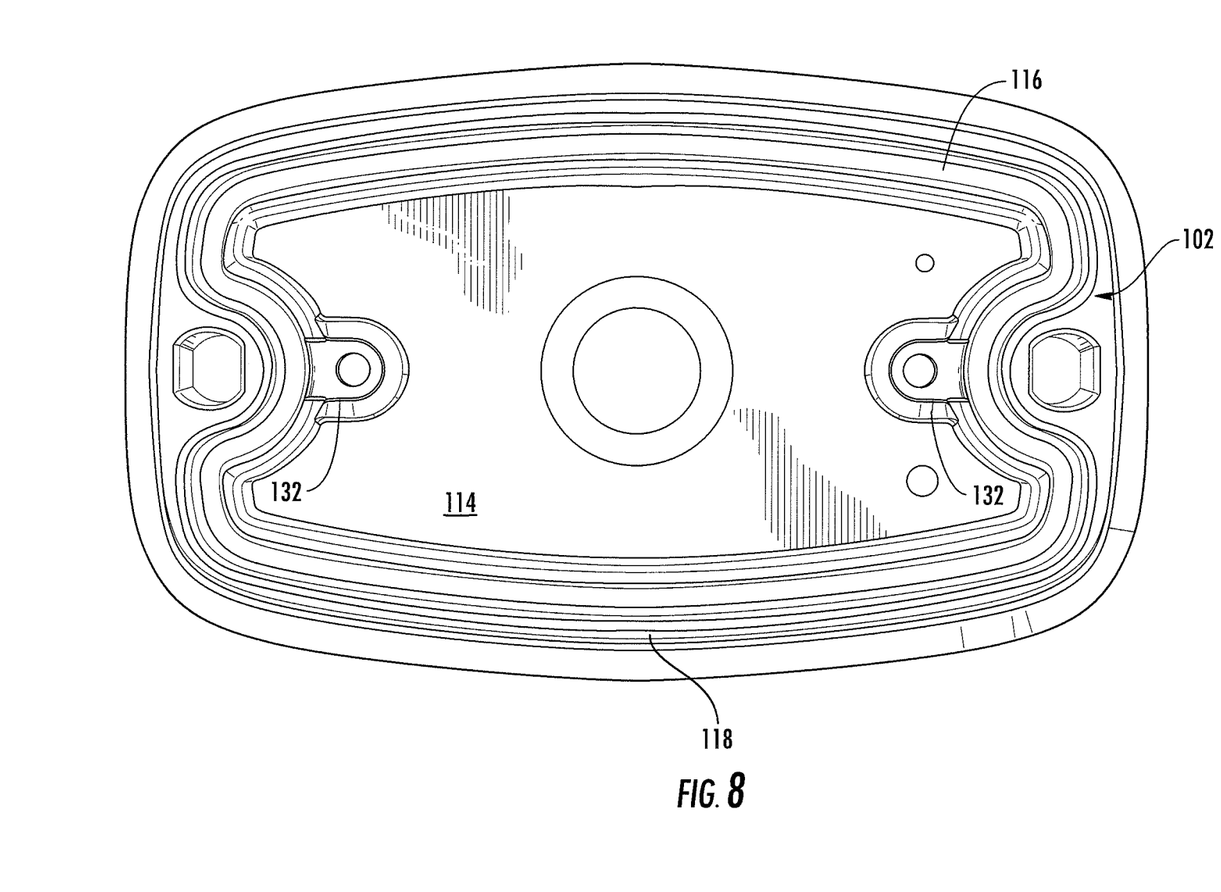
FIG. 8 is a frontal view of the base, all other components are omitted for clarity.

Referring to FIGS. 2 and 8, the thermally conductive base 102 has a central recessed portion 114 which is sized to receive a PC board 108. The base 102 may be constructed from die cast aluminum, or any other cost-effective material which effectively dissipates heat generated by the lighthead's electronic components. The base 102 defines a channel 116 adjacent the periphery 118 of the lighthead 100. PC board 108 is mounted in thermally conductive relationship to the base 102 using any manner known in the art to provide strong retentive forces without impeding heat transfer between PC board 108 and the base 102. In the disclosed embodiment, PC board 108 is generally coplanar with $P_1$.

Figure 3:
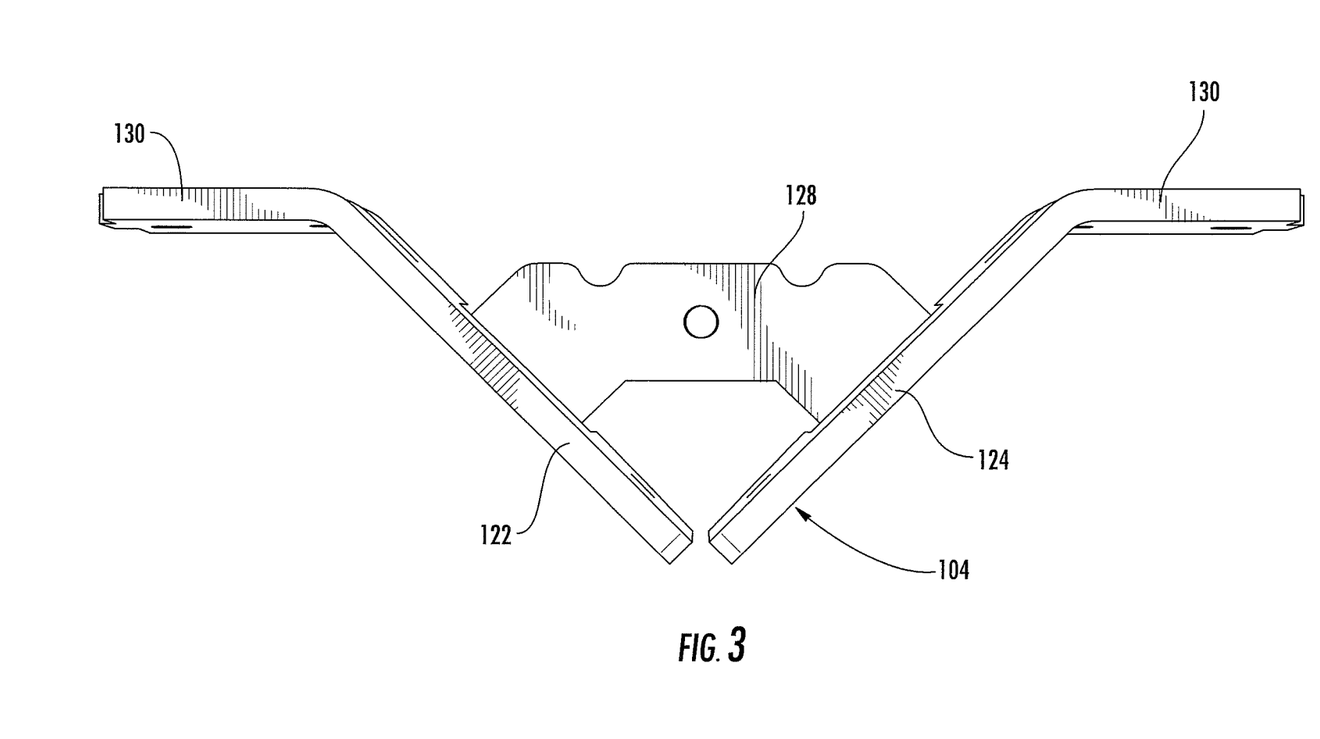
FIG. 3 is a top-plan view of the support, all other components of the lighthead are omitted for clarity.

Referring to FIG. 3, the support 104 is a unitary piece of sheet metal cut and bent to provide LED support surfaces 122, 124. A structural cross-piece 128 extends between and connects first and second surfaces 122 and 124, respectively. End tabs 130 extend from surfaces 122, 124 and provide a thermally conductive path away from LEDs 126. In the disclosed embodiment, the first and second surfaces 122 and 124 are oriented substantially transverse to one another, and extend away from the plane $P_1$. Other angular relationships between surfaces 122, 124 are compatible with the disclosed lightheads. The position and orientation of the surfaces 122, 124 and the associated LEDs 126, is designed to produce a warning light signal meeting the requirements for a 180° warning light and enhance visibility of the lighthead to individuals positioned close to a plane represented by the vehicle body panel upon which the lighthead is mounted. Conventional panel mounted warning lights meeting this standard typically lack visibility from such vantage points. The cross-piece 128 reinforces the first and second surfaces 122 and 124, and provides a secure attachment point for the second PC board 110 (described in further detail below).

Figure 4:
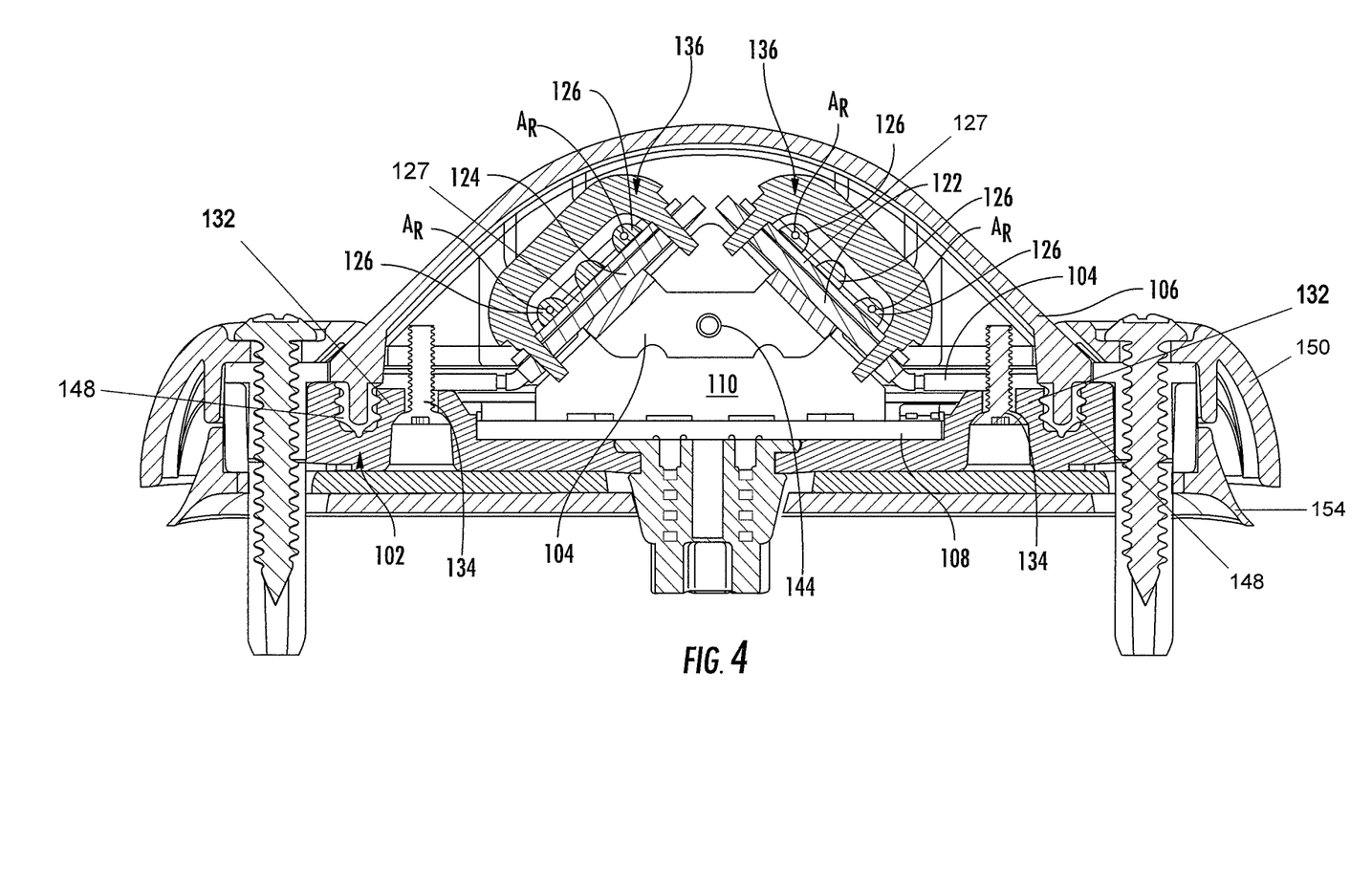
FIG. 4 is a cross-sectional view of the lighthead taken along line 4-4 of FIG. 1.
Figure 5:
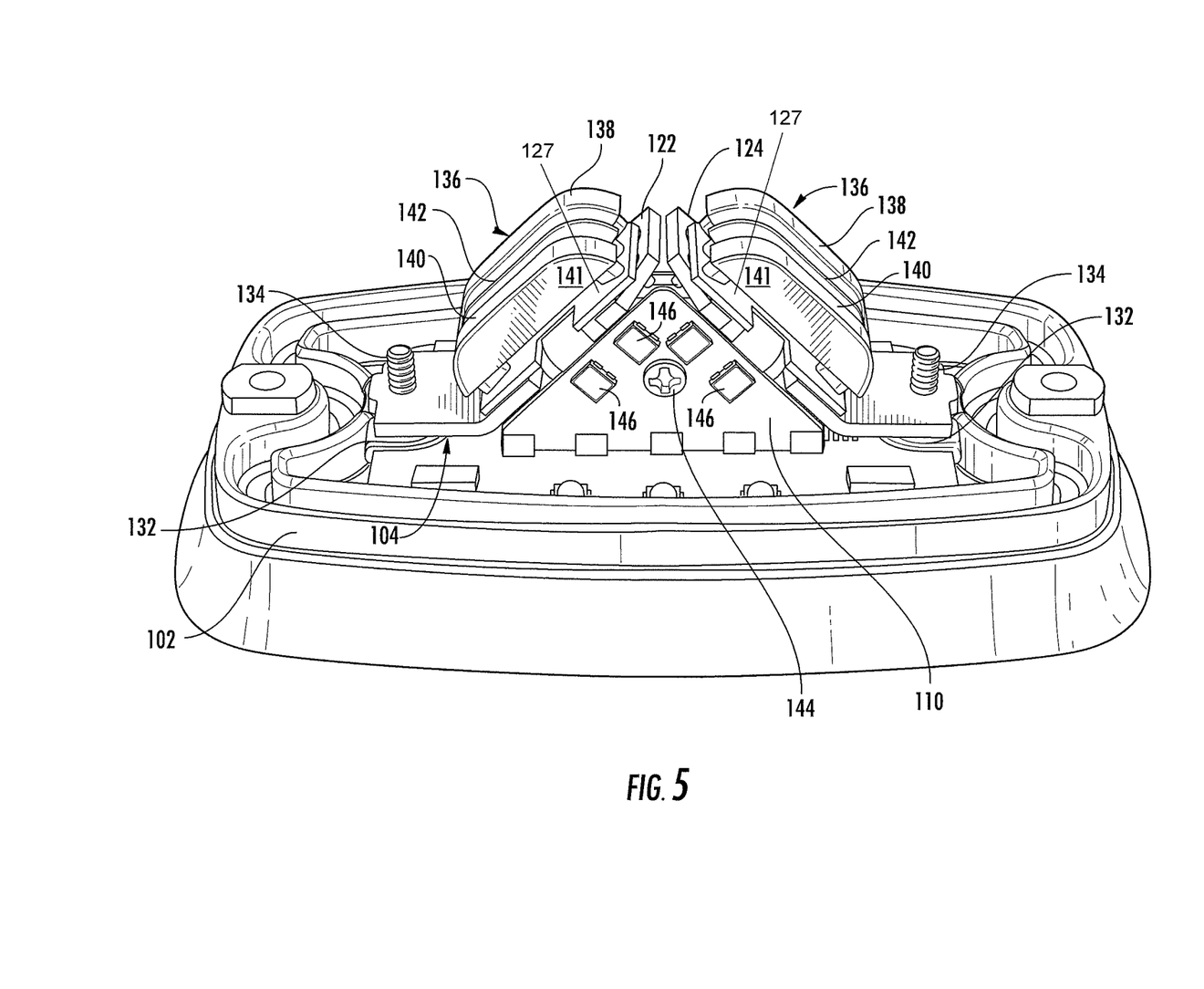
FIG. 5 shows a bottom perspective view, of the lighthead of FIG. 1, the lens and the bezel are omitted for clarity.

The support 104 is mounted in thermally conductive relationship to the base 102. As shown in FIGS. 4 and 5, the support 104 is secured at the end tabs 130 via fasteners 134 to a pair of platforms 132 (see also FIG. 8) raised from the recessed portion 114 of the base 102. The platforms 132 extend the connection point between the support 104 and the base 102 away from the vertically oriented plane $P_1$.

A first plurality of LEDs 126 are mounted to PC boards 127 secured in thermally conductive relationship to the first and second surfaces 122 and 124 and provide a first distinct light emission pattern. Power is delivered to PC boards 127 through flexible connectors fabricated as part of PC boards 110 and 127, though other electrical connections between PC boards are known and compatible with the disclosed embodiment. The first plurality of LEDs 126 are arranged to emit light in a generally horizontal wide angle beam. In one embodiment, the first plurality of LEDs 126 and the support 104 are configured to provide high visibility over 180° centered on a line vertically bisecting the lighthead 100. The first plurality of LEDs 126 and optics 136 are configured to generate a light emission pattern meeting the photometric intensity and spread requirements of the Society of Automotive Engineers (SAE) Standard J 845 class 1.

Figure 9:
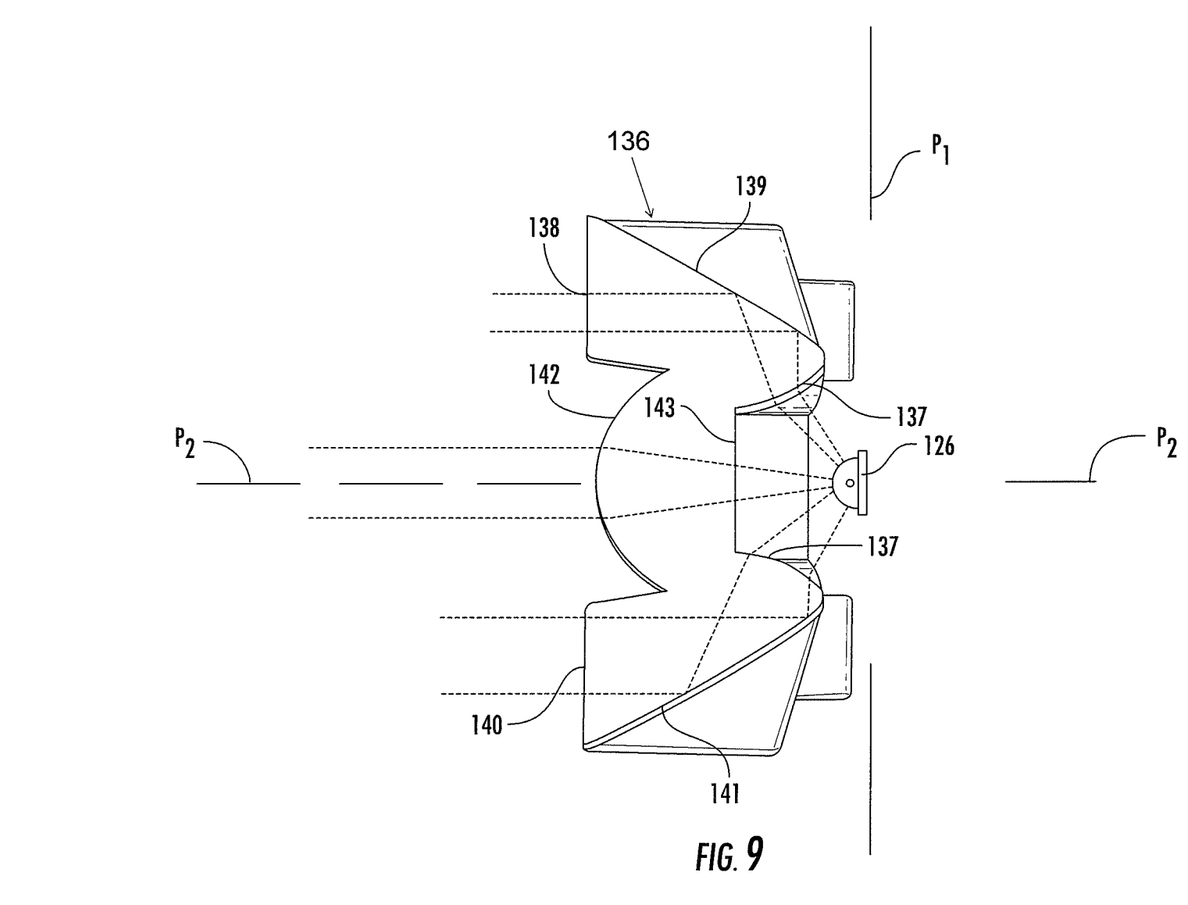
FIG. 9 shows a sectional view of the optics as seen along a vertical line passing through one die of the first plurality of LEDs.

As shown in FIGS. 2, 4, and 5, optics 136 cover each group of the first plurality of LEDs 126 and cooperate with the first plurality of LEDs 126 to provide the first distinct light emission pattern. The optics 136 collimate the light emitted from the LEDs 126 into a generally horizontal direction, and spread the light emitted in a wider and more consistent pattern within the horizontal plane than is possible with the LEDs alone. Optics 136 are constructed of surfaces designed to cooperate to produce the desired vertically collimated, wide-angle beam according to well-understood optical principles. As best seen in FIG. 9, the optic 136 has top, bottom and intermediate emission surfaces 138, 140, and 142, respectively. Refracting surfaces 137 cooperate with internal reflecting surfaces 139, 141 to re-direct light emitted from LEDs 126 into directions generally parallel with plane $P_2$. Light redirected by surfaces 137, 139 and 141 meets emission surfaces 138, 140 at a right angle and passes through emission surfaces 138, 140 with little further change in direction relative to plane $P_2$. Refracting surface 143 cooperates with curved emission surface 142 to vertically collimate light emitted from LEDs 126. Emission surface 142 also refracts light passing through it, with the shape of surfaces 142 and 143 selected to result in the desired, vertically collimated wide angle emission pattern. The internal reflecting surfaces 139 and 141 may be aspheric, as shown in the disclosed embodiment, although other known surface shapes are compatible with the disclosed multifunction lighthead 100.

Optic 136 is constructed from the sectional shape shown in FIG. 9 projected along line 4-4 and swept about an axis of revolution AR (FIGS. 2 and 4) at lateral ends of the optic 136. AR is centered on the area of light emission of the end LED 126 in each group. The lateral ends are swept in a ninety (90) degree arc about the axis of revolution AR to form curved refracting surfaces 137, 143 and curved emission surfaces 138, 140, and 142. The swept configuration of the lateral optic ends maximizes the angle of light emission in the horizontal plane $P_2$ such that light emitted by LEDs mounted to the first surface 122 overlaps with light emitted by LEDs mounted to the second surface 124 providing a continuous horizontal pattern of light emission. Optic 136 is designed to re-direct light emitted from LEDs 126 on trajectories divergent from plane $P_2$ into trajectories substantially parallel with plane $P_2$. Some vertical spread to the light emission pattern from LEDs 126 is permissible and may be necessary to meet the relevant light emission standard. Generally speaking the vertical spread of the desired wide angle horizontal beam is less than 20° up or down relative to plane $P_2$ and desirably less than 10° up or down relative to plane $P_2$.

The support 104 provides clearance away from a mounting surface of a vehicle (not shown), extending LEDs 126 and optic 136 beyond a bezel 150 (see FIG. 4) which would otherwise impede visibility of the light signal from directions close to plane $P_1$. Accordingly, the optics 136, V-shaped design of the support 104, and raised platforms 132 improve visibility from vantage points close to $P_1$. As one example, these vantage points correspond to that of pedestrians or motorists in front and behind a vehicle and close to the vehicle's path of travel when the subject multifunction lightheads 100 are mounted to the side body panels of the vehicle. The enhanced visibility of the subject lightheads is intended to supplement light signals generated by warning lights mounted to the front and rear of the vehicle.

In the embodiment where the first plurality of LEDs 126 comply with SAE standards J845 class 1, the first plurality of LEDs 126 emit a high intensity vertically collimated wide-angle beam of light which may be seen at any point between vantage points coplanar with $P_1$. Consequently, when the lighthead is mounted on the side panels of an emergency vehicle, pedestrians and motorists positioned directly behind or directly in front of the emergency vehicle can see light emitted by the first plurality of LEDs 126.

Figure 6:
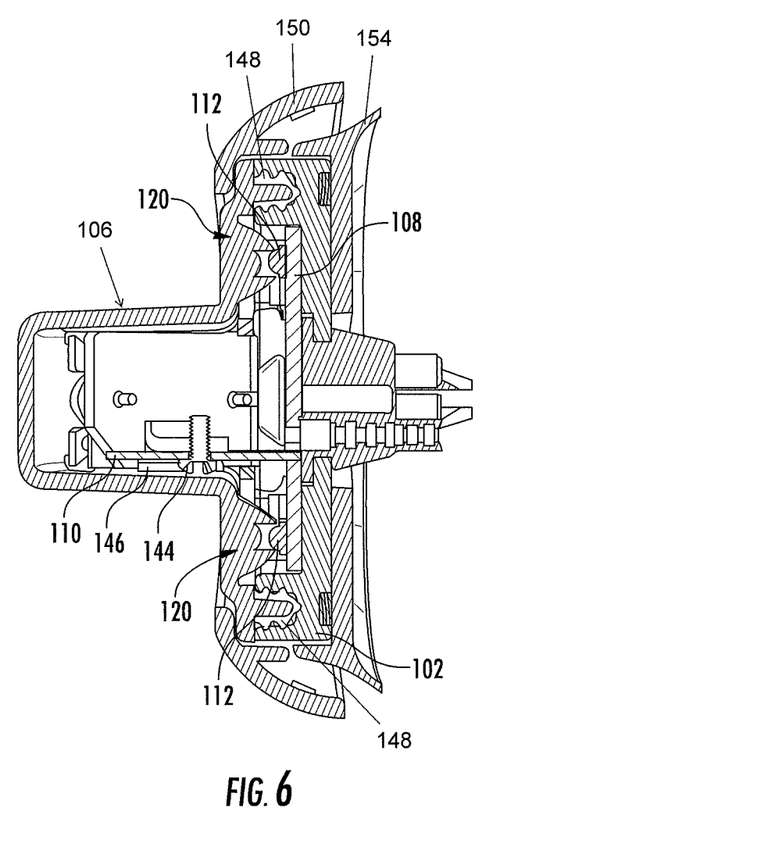
FIG. 6 is a cross-sectional view of the lighthead taken along line 6-6 of FIG. 1.

Referring to FIGS. 4, 5 and 6 PC board 110 projects perpendicularly from the first PC board 108. The second PC board 110 may be soldered to the first PC board and a fastener 144 or other means may secure the second PC board 110 to the cross-piece 128 of the support 104. Alternatively, plug type connectors may be used to form electrical connections between the first and second PC boards 108, 110. The second PC 110 board projects as far from plane $P_1$ as the support 104.

As best seen in FIGS. 5 and 6, a second plurality of LEDs 146 are mounted to the second PC board 110. The second plurality of LEDs 146 is arranged on the second PC board 110 to provide a second distinct light emission pattern. As shown in FIGS. 5 and 6, the second plurality of LEDs are oriented to emit light in a direction transverse to plane $P_2$. The second plurality of LEDs 146 may function as ground lights, and are mounted at a position on the second PC board 110 so that the light the second plurality of LEDs 146 emits is not blocked by the lip created by the central recessed portion 114 and the peripheral base channel 116 or bezel 150. Altering the dimensions of the lighthead 100 so that a greater surface area projects beyond the lip and bezel provides more surface area to which the second plurality of LEDs 146 may be attached, and increases the potential for a greater degree of illumination from the second plurality of LEDs 146.

A third plurality of LEDs 112 is mounted to the first PC board 108. The third plurality of LEDs 112 is oriented to emit beams of light in a generally horizontal direction. The type of LED utilized in the third plurality of LEDs 112 is selected to provide a specific third distinct light emission pattern e.g. illumination in support of search, traffic stop, rescue, and arrest activities.

In one embodiment, the third plurality of LEDs 112 are high intensity white LEDs. High intensity white LEDs can provide a takedown light emission pattern of the type utilized by law enforcement officials when conducting a traffic stop to illuminate the cabin of the vehicle being stopped. Alternatively, high intensity white LEDs can provide an alley light emission pattern to spotlight areas to either side of the vehicle. The focused beam of light necessary to produce the takedown/alley light emission pattern is provided by an optic 120. In the embodiment shown in FIGS. 6 and 7, the optic 120 is a total internal reflection (TIR) optic molded into the lens 106. Alternatively, optic 120 or lens 106 may include features to re-direct light from LEDs 112 into a downward direction relative to plane $P_2$ to provide supplemental area illumination adjacent the body panel to which the lighthead 100 is mounted.

The location on the vehicle where the lighthead 100 is mounted determines whether the first plurality of LEDs provide a takedown or an alley lighting effect. The takedown lighting effect is provided by mounting and orienting the lighthead 100 to emit a high intensity beam of light in a direction aligned with the vehicle's direction of travel. For example, this function can be accomplished using a pedestal mount (not shown) connected to the push bumper or front bumper of the vehicle. The takedown light emission pattern may alternately be provided by mounting the lighthead to the front grille of the vehicle.

The alley light emission pattern is provided by mounting and orienting the lighthead 100 to emit a high intensity beam of light in a direction generally transverse to the vehicle's direction of travel. For example, the alley light emission pattern may be provided by mounting the lighthead 100 to the front quarter panel, door panel, or side view mirror of the vehicle.

Figure 7:
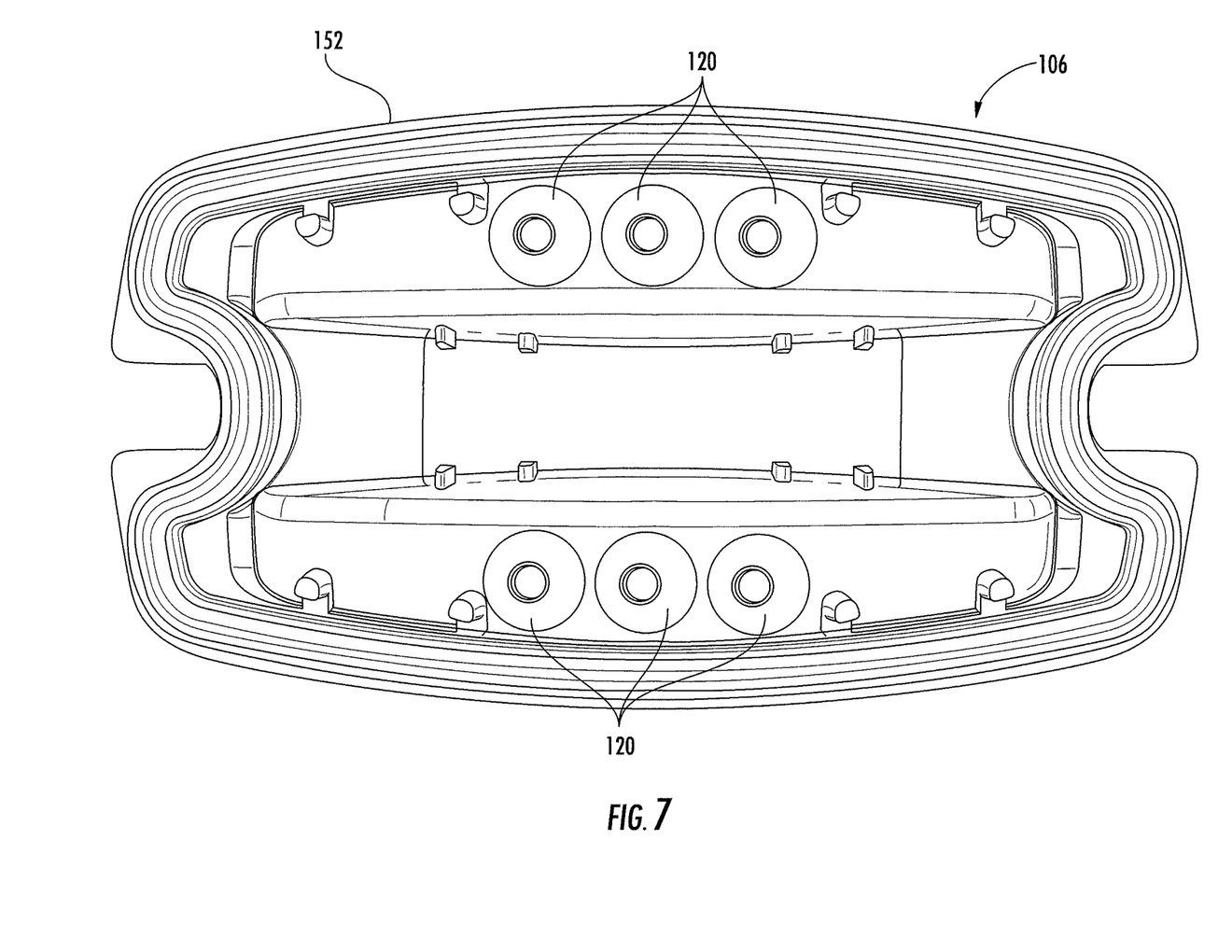
FIG. 7 shows the rearward-facing side of the lens, all other components of the lighthead are omitted for clarity.

In the embodiment shown in FIGS. 4, 6 and 7, the lens 106 is secured to the base 102 in weather-tight relationship. A seal 148 projects from the interior-facing side of the lens 106 along a periphery of the lens 152 in a configuration complementary to the peripheral channel 116. In the disclosed embodiment a bezel 150 secures the lens 106 in weather tight communication against the base 102, though the bezel may not be required.

As seen in FIGS. 4 and 6, a gasket 154 projects from the perimeter of the base 118 in a direction opposite the lens 106. In embodiments where the lighthead 100 is mounted directly to the surface of a vehicle, the gasket ensures a weather tight seal against the vehicle, preventing salt and moisture from penetrating behind the lighthead 100.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. A lighthead for affixing to a mounting point on a vehicle, the mounting point in a first plane, said lighthead comprising:

a support projecting away from the first plane in a first direction and including at least one support surface not parallel with the first plane;

at least one first PC board mounted to said at least one support surface;

a first plurality of LEDs mounted to said at least one first PC board, said first plurality of LEDs having optical axes in a second plane perpendicular to the first plane and said first plurality of LEDs combining to emit a first band of light;

a second PC board extending perpendicular to the first plane on one side of the second plane;

a second plurality of LEDs mounted to said second PC board, said second plurality of LEDs emitting a second band of light to one side of and away from the second plane; and a light transmissive lens enclosing said first and second PC boards, wherein said at least one support surface comprises two support surfaces perpendicular to each other and said second plane; and wherein the first band of light and the second band of light provide visibility over 180° centered on a line vertically bisecting the lighthead.

2. A lighthead for mounting to a vehicle, comprising:

a base;

a base PC board attached to said base, said base PC board defining a first plane;

a support attached to said base including a bottom support surface defining a second plane perpendicular to the first plane, and two distal support surfaces oriented in intersecting planes each substantially perpendicular to the second plane;

a first plurality of LEDs positioned on said two distal support surfaces;

a second plurality of LEDs positioned on the bottom support surface; and a light transmissive lens enclosing said first and second pluralities of LEDs.

3. The lighthead of claim 2, further comprising a third plurality of LEDs mounted on the base PC board.

4. The lighthead of claim 2, further comprising a bottom PC board attached to the bottom support surface, wherein said second plurality of LEDs are mounted on said bottom PC board.

5. The lighthead of claim 4, further comprising at least one distal PC board attached to the two distal support surfaces, wherein said first plurality of LEDs are mounted on said at least one distal PC board.

6. The lighthead of claim 2, further comprising optics, distinct from said light transmissive lens, over each of the two distal support surfaces for directing light from the first plurality of LEDs.

7. The lighthead of claim 6, wherein the optics over each of the two distal support surfaces spread light from said first plurality of LEDs up to 180 degrees.

8. The lighthead of claim 6, further comprising a third plurality of LEDs mounted on the base PC board and optics over each of the third plurality of LEDs for directing light from the third plurality of LEDs.

9. The lighthead of claim 8, wherein the optics over each of the third plurality of LEDs are integral to said light transmissive lens.

10. The lighthead of claim 2, wherein the first plurality of LEDs has optical axes in a plane perpendicular to the first plane and wherein said first plurality of LEDs combine to emit a first band of light.

11. The lighthead of claim 10, wherein the second plurality of LEDs emit a second band of light in a direction perpendicular to the second plane.

12. The lighthead of claim 2, wherein said support is mounted to said base with at least one fastener extending through said base into said support.

13. The lighthead of claim 2, further comprising a bezel extending around a periphery of said base and a periphery of said light transmissive lens, and a gasket on a back surface of said base.

14. The lighthead of claim 13, wherein said bezel has two mounting holes for receiving fasteners to mount the lighthead to a vehicle.

15. A lighthead for mounting to a vehicle, comprising:

a base;

a base PC board attached to said base, said base PC board defining a first plane;

a support attached to said base including a bottom support surface defining a second plane perpendicular to the first plane, and two distal support surfaces oriented at acute angles with respect to the first plane;

at least one distal PC board attached to the two distal support surfaces;

a first plurality of LEDs mounted on said at least one distal PC board;

a bottom PC board attached to the bottom support surface;

a second plurality of LEDs mounted on said bottom PC board;

a third plurality of LEDs mounted on the base PC board; and a light transmissive lens enclosing said first, second, and third pluralities of LEDs.

16. The lighthead of claim 15, where the two distal support surfaces are oriented in intersecting planes each substantially perpendicular to the second plane.

17. The lighthead of claim 15, further comprising optics, distinct from said light transmissive lens, over each of the two distal support surfaces for directing light from the first plurality of LEDs.

18. The lighthead of claim 17, further comprising optics, integral with said light transmissive lens, over each of the third plurality of LEDs for directing light from the third plurality of LEDs.

19. The lighthead of claim 15, wherein the second plurality of LEDs emit a band of light in a direction perpendicular to the second plane, and wherein the third plurality of LEDs emit a band of light in a direction perpendicular to the first plane.

20. The lighthead of claim 15, further comprising a bezel extending around a periphery of said base and a periphery of said light transmissive lens and a gasket on a back surface of said base.

* * * * *